United States Patent [19]

Yonezawa et al.

[11] Patent Number: 4,748,609

[45] Date of Patent: May 31, 1988

[54] METHOD AND APPARATUS FOR COMPOSITE TRACKING SERVO SYSTEM WITH TRACK OFFSET CORRECTION AND ROTARY OPTICAL DISC HAVING AT LEAST ONE CORRECTION MARK FOR CORRECTING TRACK OFFSET

[75] Inventors: Seiji Yonezawa, Hachioji; Masatoshi Ohtake, Ome; Masaru Ito, Sagamihara; Toshiaki Tsuyoshi, Kokubunji; Kazuo Ichino, Nishitama; Harushige Nakagaki, Yokohama, all of Japan

[73] Assignee: Hitachi, Ltd., Tokyo, Japan

[21] Appl. No.: 845,340

[22] Filed: Mar. 28, 1986

[30] Foreign Application Priority Data

Mar. 29, 1985 [JP] Japan .................................. 60-63587
Jul. 5, 1985 [JP] Japan ................................ 60-146507
Jul. 29, 1985 [JP] Japan ................................ 60-165777

[51] Int. Cl.$^4$ .......................... G11B 7/095; G11B 7/24
[52] U.S. Cl. ......................................... 369/44; 369/46; 369/105; 369/106; 369/124; 369/275
[58] Field of Search .................................... 369/44–46, 369/54, 58, 100, 105, 106, 109, 111, 124, 275; 358/335, 342; 360/77

[56] References Cited

U.S. PATENT DOCUMENTS

| | | | |
|---|---|---|---|
| 3,876,842 | 4/1975 | Bouwhuis | 369/46 X |
| 4,209,804 | 6/1980 | Dil | 369/109 X |
| 4,363,116 | 12/1982 | Kleuters et al. | 369/44 X |
| 4,364,118 | 12/1982 | Maeda et al. | 369/44 |
| 4,375,088 | 2/1983 | de Haan et al. | 369/44 X |
| 4,402,061 | 8/1983 | Hazel et al. | 369/46 X |
| 4,428,069 | 1/1984 | Hazel et al. | 369/100 X |
| 4,432,083 | 2/1984 | Hsieh et al. | 369/44 |
| 4,456,981 | 6/1984 | Silvy et al. | 358/342 X |
| 4,464,714 | 8/1984 | Huijser et al. | 369/44 X |
| 4,553,228 | 11/1985 | Gerard et al. | 369/275 X |
| 4,613,961 | 9/1986 | Aarts | 369/44 |

FOREIGN PATENT DOCUMENTS 59-19250 1/1984 Japan .
59-38939 3/1984 Japan .

Primary Examiner—Raymond F. Cardillo
Assistant Examiner—W. R. Young
Attorney, Agent, or Firm—Antonelli, Terry & Wands

[57] ABSTRACT

A composite wobbled tracking servo system uses a rotary optical disc which has a header field and a data field alternately arranged along the direction of rotation to provide a sector, and which includes pregrooves formed in at least the data field and at least one pair of wobbled track marks disposed in the header field in a relation wobbled relative to the center of a track. A light spot is directed toward and onto the optical disc to detect a push-pull tracking error signal from the reflection of the light spot diffracted by the pregroove, and a wobbled tracking error signal is detected from the reflection of the light spot traversing the wobbled track marks. The push-pull tracking error signal is corrected on the basis of the wobbled tracking error signal to attain the tracking control with higher accuracy, thereby eliminating an undesirable track offset attributable to tilting or eccentricity of the optical disc.

21 Claims, 14 Drawing Sheets

HEADER FIELD ← — ⊢ — → DATA FIELD

δy = 0
  δy > 0
  δy < 0

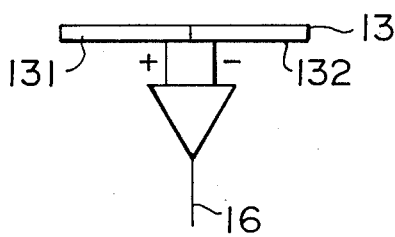

METHOD AND APPARATUS FOR COMPOSITE TRACKING SERVO SYSTEM WITH TRACK OFFSET CORRECTION AND ROTARY OPTICAL DISC HAVING AT LEAST ONE CORRECTION MARK FOR CORRECTING TRACK OFFSET

BACKGROUND OF THE INVENTION

This invention relates to a tracking servo system for tracking the center of a track with a light spot, and more particularly to a composite tracking servo system in which a differential diffraction method using pregrooves or a so-called push-pull tracking method is combined with a wobbled tracking method using wobbled track marks disposed in a relation wobbled relative to the center of a track, and which is suitable for application to an optical code data memory such as a recordable/reproducible adding type optical disc system or an erasable type-optical disc system.

In the push-pull tracking method, an optical disc having guide grooves or so-called pregrooves formed previously along the direction of rotation of the disc is irradiated with a light spot, and an unbalance of the distribution of the reflection of light diffracted from the pregrooves is based to detect a track error which is fed back to a servo system. This push-pull tracking method is disclosed in, for example, U.S. Pat. No. 4,363,116. Since this push-pull tracking method utilizes the distribution of the reflection of light diffracted from the pregrooves, an offset attributable to an eccentricity or tilt of the disc tends to occur, and, because of such an offset, the light spot cannot be accurately positioned on the center of the track. According to studies conducted by the inventors, a tilt of 0.7° or an eccentricity of 100 μm, for example, results in an offset of about 0.1 μm.

On the other hand, a tracking servo system of three spots type is widely employed in a playback-only system such as a CD (a compact disc). However, this tracking servo system is unfit for application to a combined recording/reproduction system. The tracking servo system of three spots type is disclosed in, for example, U.S. Pat. No. 3,876,842.

SUMMARY OF THE INVENTION

With a view to solve the prior art problem of the offset pointed out above, it is a primary object of the present invention to provide an optical tracking method and apparatus which can eliminate the undesirable offset (the error component) thereby ensuring more accurate tracking.

The present invention utilizes the so-called track wobbling method in which an optical disc is previously formed with one or more sets of wobbled pits disposed in a relation wobbled relative to the center of a track, and the relative amounts of light reflected after being passed through these pits as a result of irradiation with a light spot are compared to detect a track error, if any. This track wobbling method is already known per se and disclosed in, for example, U.S. Pat. No. 4,223,187.

According to this track wobbling method, the true position of light spot passed through the wobbled pits can be detected. Therefore, a more accurate servo system can be provided as compared to a servo system utilizing the push-pull method based on the distribution of diffraction by the pregrooves. On the other hand, however, the track wobbling method requires provision of 1,000 or more wobbled pits per track, resulting in a corresponding reduced data efficiency. The track wobbling method has such another problem that it is not compatible with the push-pull method.

In view of the above prior art problems, the present invention provides a tracking system of high utility which has such features that (1) the merit of the wobbled tracking method is maintained; (2) the data efficiency is not degraded; and (3) it is compatible with the push-pull tracking system which is a prior art system most widely employed in this field. The tracking servo system according to the present invention is a composite of the push-pull tracking system using the pregrooves and the wobbled tracking system using the wobbled track marks, and has a dual structure so that an offset of a low-frequency component from the dc level, which offset tends to occur in the push-pull servo system, can be suppressed in the wobbling servo system. More precisely, one complete track on an optical disc is divided into a plurality of sectors each of which includes a header field (or an index field) previously formed with pits and a data field on which the user records desired information. In the header field, wobbled track marks in the form of one or more pairs of elongate pits are previously formed in a relation wobbled relative to the center of the track, and pregrooves for tracking purpose are previously formed in at least the data field. The word "previously" as used herein means that the wobbled track marks and the pregrooves have been provided before the user records desired information on the data field. Preferably, the wobbled track marks and the pregrooves which have been formed during preparation of a mother disc are provided by replication of the mother disc. It is also preferable that address information (a track address and a sector address) for identifying the specific sector and a sector mark indicating the head of the specific sector are previously formed in the header field. The wobbled track mark may act also as the sector mark. In the recording and reproduction of data on and from the data field, a light spot is directed to the prewobbling pits disposed in the header field, so as to detect an accurate, prewobbling tracking error signal free from any offset of the position of the light spot from the center of the track. Then, a push-pull tracking error signal including an offset and utilizing the distribution of the reflection of light diffracted from the pregrooves is corrected on the basis of the prewobbling tracking error signal, thereby eliminating the offset attributable to deviation of the diffracted light beam on a light detector and ensuring stable and highly accurate tracking operation. While tracking in the manner described above, data are recorded on or reproduced from one of the pregrooves or a land between the pregroove and an adjacent pregroove.

DESCRIPTION OF THE PREFERRED EMBODIMENTS

The tracking error signal detecting method according to the present invention is the combination of the prewobbling method and the push-pull method as described already. This detecting method will be first described.

Figure 1:
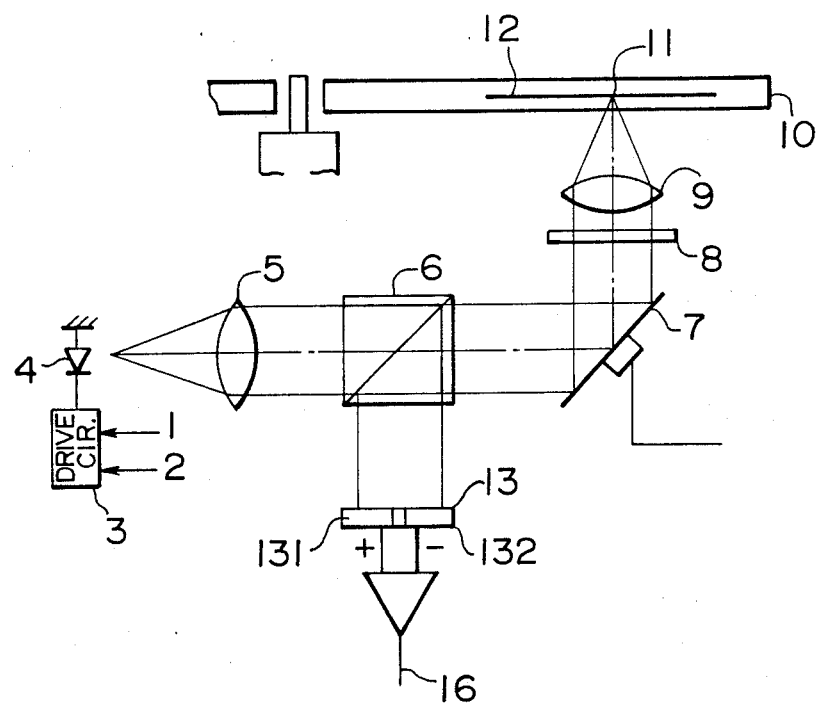
FIG. 1 shows an optical system for recording and reproducing information on and from an optical disc.
Figure 2A:
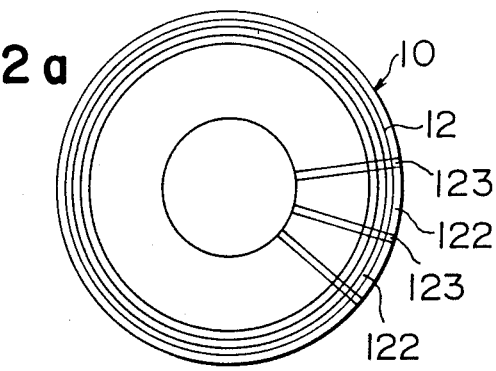
FIGS. 2a to 2d illustrate various examples of the structure of pregrooved tracks of a recordable/reproducible optical disc employed in the present invention.

FIG. 1 shows the structure of one form of an optical system for recording and reproducing information on and from an optical disc. Referring to FIG. 1, semiconductor laser drive signals 1 and 2 are applied to a semiconductor laser driver circuit 3 to drive a semiconductor laser 4. Light emitted from the semiconductor laser 4 passes through a coupling lens 5, a beam splitter 6, a galvana mirror 7, a ¼ wavelength plate 8 and an objective lens 9 to form a light spot 11 on a recording surface of an optical disc 10 thereby irradiating a track 12. The reflection of light diffracted from the track 12 returns to the optical system again, and, after being reflected by the beam splitter 6, is received by a two-divided light detector 13 (light-receiving sections 131 and 132) to be turned into an electrical signal. FIGS. 2a to 2d illustrate various examples of the structure of pregrooved tracks of a recordable/reproducible optical disc of the present invention adapted to be used in such an optical disc apparatus. Referring to FIG. 2a, one complete track 12 is divided into, for example, 64 sectors each of which includes a set of a header field 123 previously formed with pits and a data field 122 on which the user records desired information. In the header field 123, a selected number of, or, for example, a pair of elongate pits (wobbled track marks) 20-1 and 20-2 wobbled relative to the track center are previously formed by replication, so as to detect a tracking error signal according to the prewobbling method. Besides these elongate pits 20-1 and 20-2, pits 14 indicative of a track address, a sector address, a synchronizing signal, etc. are formed along the track center without being arranged in a wobbled relation. However, these pits 14 are not necessarily essentially required in the tracking servo system of the present invention and may be omitted as required.

In FIGS. 2a to 2d, the wobbled track marks 20-1 and 20-2 act also as sector marks indicating the head of the corresponding sector. However, these marks 20-1 and 20-2 may be disposed in any other position, for example, between the sector marks and the address signal prepits or in a gap area between the address signal prepits and the data field. Preferably, the prepits (including the wobbled track marks) previously formed in the header field 123 are of phase structure having a depth which is ¼ or ⅛ of the wavelength of the laser beam used for recording and reproduction of information on and from the data field 122. It is also preferable that at least the pregrooves formed in the data field 122 are of phase structure having a depth which is ⅛ of the wavelength of the laser beam and are concentrically or spirally arranged.

Figure 2B:
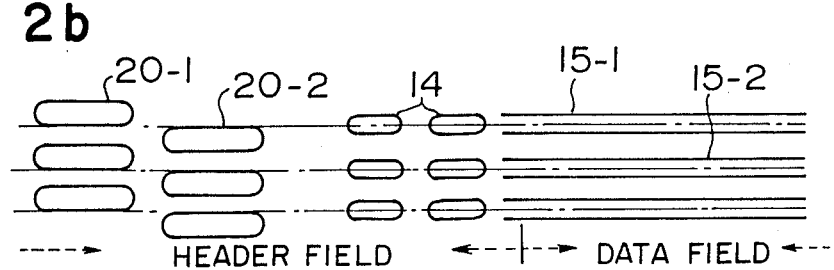
Figure 2C:
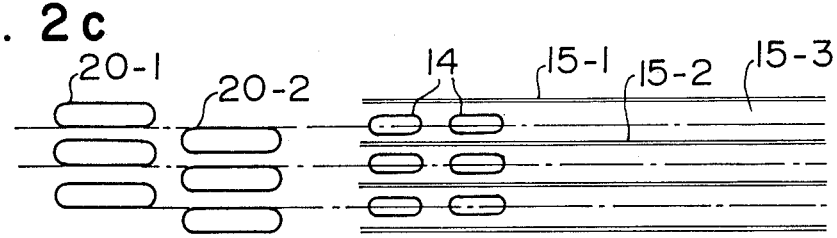
Figure 2D:
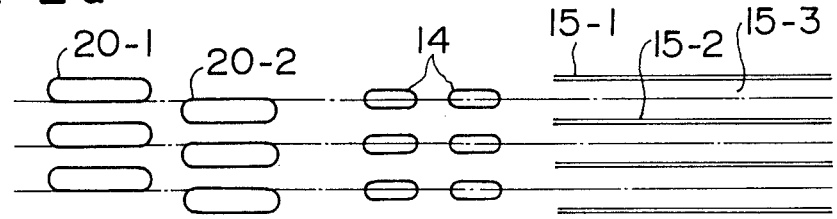

In FIG. 2b, the track center registers with the center of the pregrooves 15-1 and 15-2, and data are recorded on these pregrooves. Although, in FIG. 2b, no pregrooves are provided in the area where the prepits 14 are formed, the pregrooves 15-1 and 15-2 may be formed in this area too. In FIGS. 2c and 2d, the track center registers with the centerline extending between the adjacent pregrooves 15-1 and 15-2, and data are recorded on a land 15-3 defined between the pregrooves 15-1 and 15-2. As shown in FIG. 2d, the pregrooves 15-1 and 15-2 may be formed at least in the data field 122. Further, as shown in FIG. 2c, the pregrooves 15-1 and 15-2 may also be formed to sandwich the prepits 14 therebetween in the area where the prepits 14 are formed in the header field 123. Further, the pregrooves 15-1 and 15-2 may be formed to sandwich the wobbled track marks 20-1 and 20-2 therebetween and may extend thoughout the header field 123 and data field 122 without any discontinuity. The aforementioned wobbled track marks, prepits and pregrooves are previously formed during preparation of a mother disc, and a disc substrate obtained by replication of the mother disc having the wobbled track marks, prepits and pregrooves previously formed thereon is coated with a desired recording film. In the case of, for example, ablative recording, a film of a material such as a TeSePb, whose principal component is Te, is preferably used as the recording film. On the other hand, in the case of magneto-optical recording, a vertical magnetized film of a material such as TbFeCo, whose principal component is TbFe, is preferably used as the recording film. Also, in the case of phase change recording, a film of a material such as an amorphous Te compound is preferably used as the recording film.

Figure 3A:
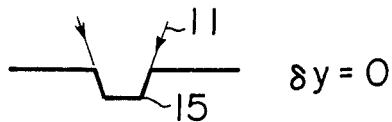
FIGS. 3a to 3d illustrate the principle of detection of a push-pull tracking error on the basis of the distribution of diffracted light.
Figure 3B:
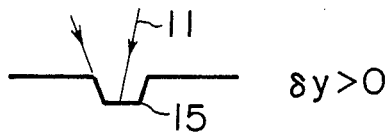
Figure 3C:
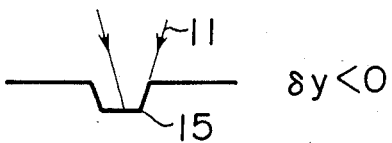
Figure 3D:
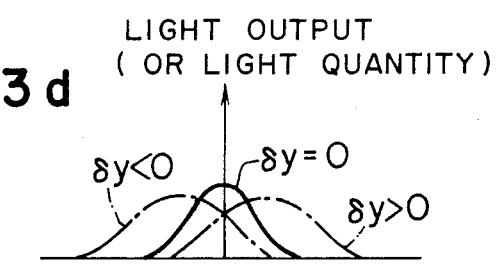

FIGS. 3a to 3d illustrate the distribution of diffracted light on the two-divided light detector 13 (the light-receiving sections 131 and 132) when the light spot 11 directed onto the pregroove 15 of phase structure deviates from the center of the pregroove 15. Deviation of the light spot 11 from the center of the track results in an asymmetrical distribution of diffracted light. Therefore, when the diffracted light from the pregroove 15 is received by the two light receiving sections 131 and 132 disposed in parallel to the track to sandwich therebetween the track, and the difference between the output signals of the two light receiving sections 131 and 132 is found, a push-pull tracking error signal 16 can be detected as shown in FIG. 3d. FIGS. 3a to 3c show the relation between the light spot 11 and the pregroove 15. An interference pattern between light of zeroth order and light o first order diffracted by the pregroove 15 appears on the two-divided light detector 13. In the absence of deviation of the light spot 11 from the track, this interference pattern is symmetrical with respect to the pregroove 15. On the other hand, in the presence of deviation, the symmetry of the interference pattern is lost, and the differential output of the two-divided light detector 13 is not zero, so that the track error can be detected. This differential output of the light detector 13 is fed back to a tracking actuator, for example, the galvana mirror 7 to constitute a tracking servo.

When the light spot 11 is directed toward or positioned on the center of the land 15-3 between the adjacent pregrooves 15-1 and 15-2 as shown in FIG. 2c or 2d, the polarity of the differential output of the light detector 13 should be inverted before being fed back to the tracking actuator or galvano mirror 7. That is, when the light spot 11 is directed toward or positioned on the land 15-3 between the pregrooves 15-1 and 15-2, the light spot 11 diverges over the two pregrooves 15-1 and 15-2, and the interference pattern due to diffraction appears on the light detector 13 as when the light spot 11 is centered on the pregroove 15. It is to be noted that the asymmetry of the interference pattern due to deviation of the light spot 11 from the track when the light spot 11 is centered on the pregroove 15 is inverse in terms of intensity distribution to the asymmetry produced when the light spot 11 is centered on the inter-pregroove land 15-3. It is therefore necessary to invert the polarity of the differential output 16 in the latter case. The light detector 13 is in no way limited to that of the two-divided type described above and may be of a three-divided type in which another light receiving section is interposed between a pair of light receiving sections for tracking purpose. The requirement is that the light detector has such a structure that at least two light detecting sections (light receiving sections) are disposed to sandwich the track therebetween in parallel to the extending direction of the track. An example of such a light detector detecting the track error, if any, on the basis of diffracted light from a pregroove is disclosed in, for example, U.S. Pat. No. 4,525,826.

Figure 4:
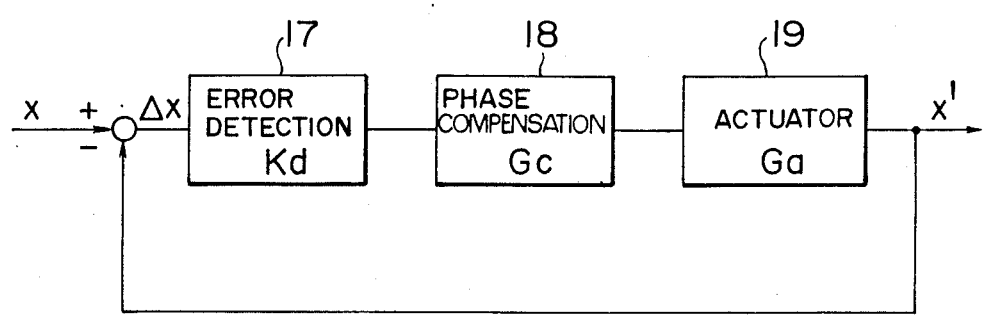
FIG. 4 is a block diagram showing the structure of a continuous tracking servo system.
Figure 5:
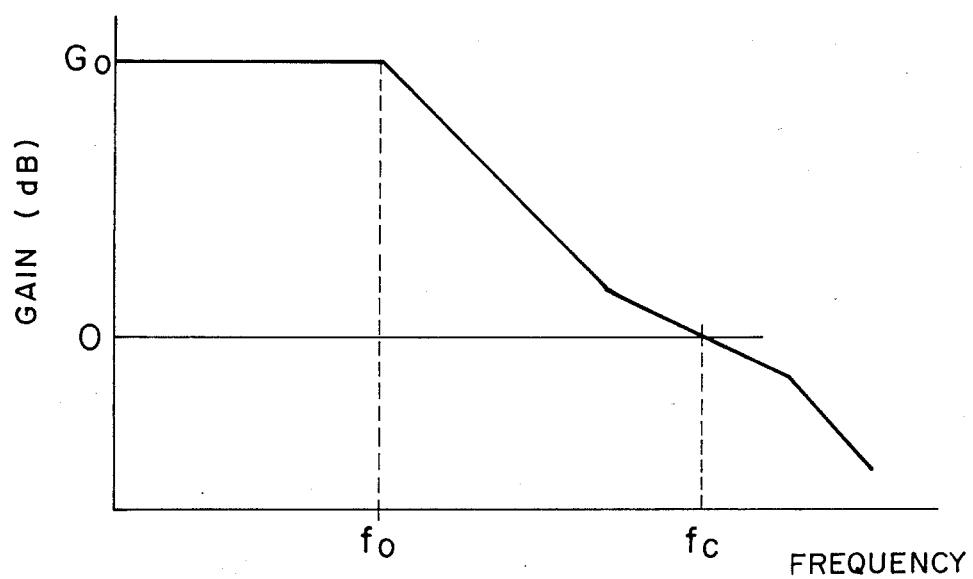
FIG. 5 is a Bode diagram for illustrating frequency characteristic of a conventional continuous tracking servo system as shown in FIG. 4.

FIG. 4 is a block diagram showing the structure of a push-pull tracking servo system based on the principle described with reference to FIGS. 3a to 3d, and FIG. 5 is a Bode diagram of the loop transfer function of the servo system shown in FIG. 4. Referring to FIG. 4, the servo system includes a tracking error detecting element (Kd) 17, a phase compensating element (Gc) 18, and a tracking actuator (Ga) 19. According to the so-called push-pull tracking system for obtaining the differential signal 16 indicative of the distribution of the reflection light diffracted from the pregroove 15, the galvana mirror 7 is moved so that the light spot 11 can follow up, for example, eccentricity of the optical disc 10 shown in FIG. 1 for the purpose of tracking control. When the mirror 7 is moved, the diffracted light distribution on the light detector 13 shifts as shown in FIG. 3d. The shifting of the diffracted light distribution results in appearance of an offset in the tracking error signal 16. Further, when the optical disc 10 tilts, they diffracted light distribution on the two light receiving sections 131 and 132 of the two-divided light detector 13 disposed in parallel to the track 12 is now out of balance, and such a phenomenon occurs in which the tracking error signal 16 does not become zero even when the light spot 11 is positioned on the track center (the center of the pregroove 15 or the center of the land 15-3), that is, a track offset occurs. Consequently, the light spot 11 cannot be accurately positioned on the track center. Therefore, according to the present invention, an offset-free prewobbling tracking error signal detected when the light spot 11 irradiates the prewobbling pits 20-1 and 20-2 in the header field 123 is utilized for offset correction of the push-pull tracking error signal 16 which includes the offset and which is detected when the light spot 11 irradiates the pregroove 15 disposed in the data field 122. In this manner, while correcting the push-pull tracking error signal 16 on the basis of the offset-free prewobbling tracking error signal, data pits are accurately recorded and reproducted, with a high S/N ratio, on and from the pregroove 15 or inter-pregroove land 15-3.

How to detect the tracking error signal from the prewobbling pits 20-1 and 20-2 shown in FIGS. 2b to 2d according to the present invention will now be described with reference to FIG. 6.

Figure 6:
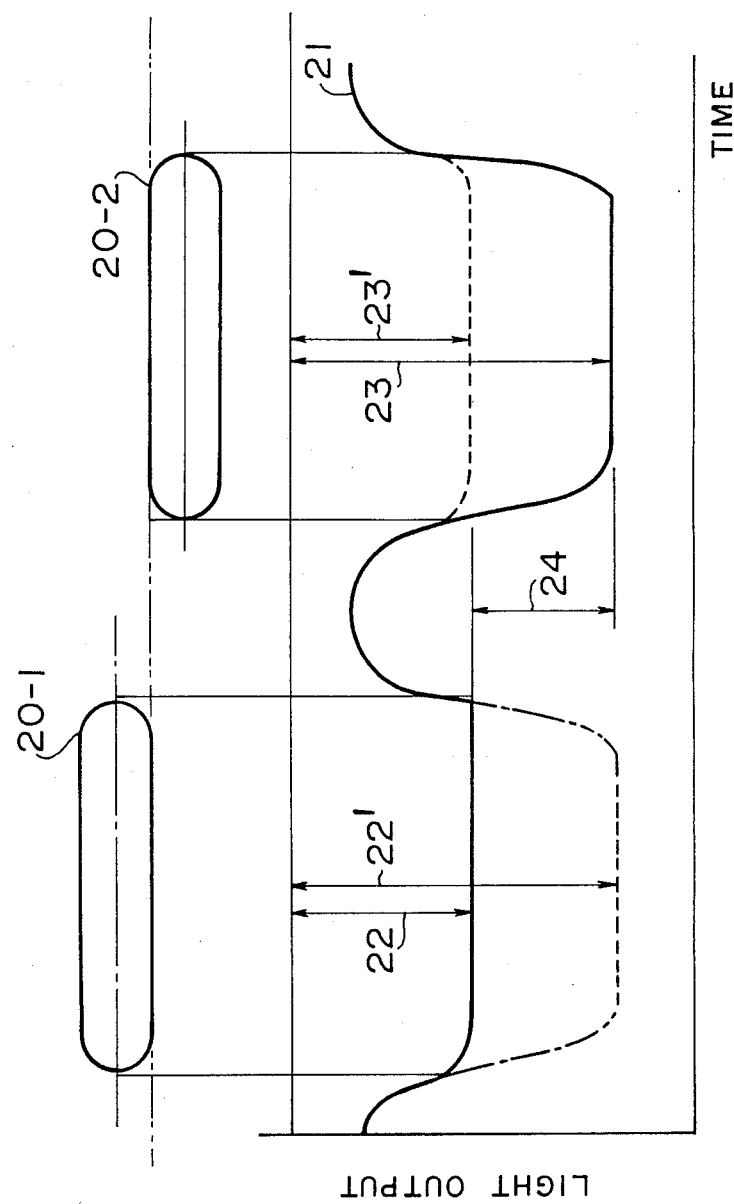
FIG. 6 illustrates how a tracking signal is obtained from prewobbling pits according to the present invention.

FIG. 6 shows the arrangement of at least one pair of elongate pits 20-1 and 20-2 disposed in a relation wobbled relative to the track center so as to detect the prewobbling tracking error signal according to the present invention and shows also the relation between the passing position of the light spot 11 and the waveform of the light output. When now the light spot 11 irradiates the pair of wobbled track marks 20-1 and 20-2 while crossing them relative to time, an output signal 21 having a waveform as shown appears from the light detector 13 (the sum of the output signals of the light receiving sections 131 and 132). It will be seen in FIG. 6 that the light output signals relevant to the elongate pits 20-1 and 20-2 arranged in the relation wobbled relative to the track center have opposite polarities depending on the transverse deviation of the center of the light spot 11 from the track center. That is, when the light spot 11 traverses the portion nearer to the pit 20-1, the output signal 21 has a waveform as shown by the dotted line, while, when the light spot 11 traverses the portion nearer to the pit 20-2, the output signal 21 has a waveform inverted by 180° in phase, as shown by the solid line. Therefore, by detecting the individual peaks 22 (22') and 23 (23') of the output signal 21 (the sum output of the two-divided or three-divided light detector) appearing when the light spot 11 traverses the pits 20-1 and 20-2 respectively and then detecting the difference signal 24 therebetween, this differential signal 24 indicates the amount and direction of deviation of the light spot 11 from the track center.

The method of detecting the prewobbling tracking error signal 24 described with reference to FIG. 6 is not based on the diffracted light distribution. Therefore, a dc tracking offset attributable to tilting of the disk 10 or, for example, movement of the lens 9 or rotation of the galvana mirror 7 as a result of tracking control does not occur, so that the amount of the true tracking error can be accurately detected.

The composite wobbled tracking servo system of the present invention can attain accurate tracking, since it comprises the combination of the two different tracking error detection methods, that is, the method of detecting the dc-offset-free tracking error signal 24 obtained from the prewobbling pits 20-1 and 20-2 shown in FIG. 6 and the method of detecting the dc-offset including tracking error signal 16 obtained from the pregroove 15 shown in FIGS. 3a to 3d. The basic block diagram of the servo system based on the pregroove method has been illustrated already in FIG. 4. Fundamentally, the servo system shown in FIG. 4 includes the tracking error detecting element (Kd) 17 converting the amount and direction of deviation of the light spot from the track center into an electrical signal according to the push-pull method, the phase compensating element (Gc) 18, and the tracking actuator (Ga) 19. However, as described already, in the case of the push-pull tracking error signal 16 utilizing the diffracted light distribution as shown in FIGS. 3a to 3d, an offset occurs inevitably in the signal 16 due to, for example, tilting of the disc 10, resulting in abnormal tracking.

Figure 7:
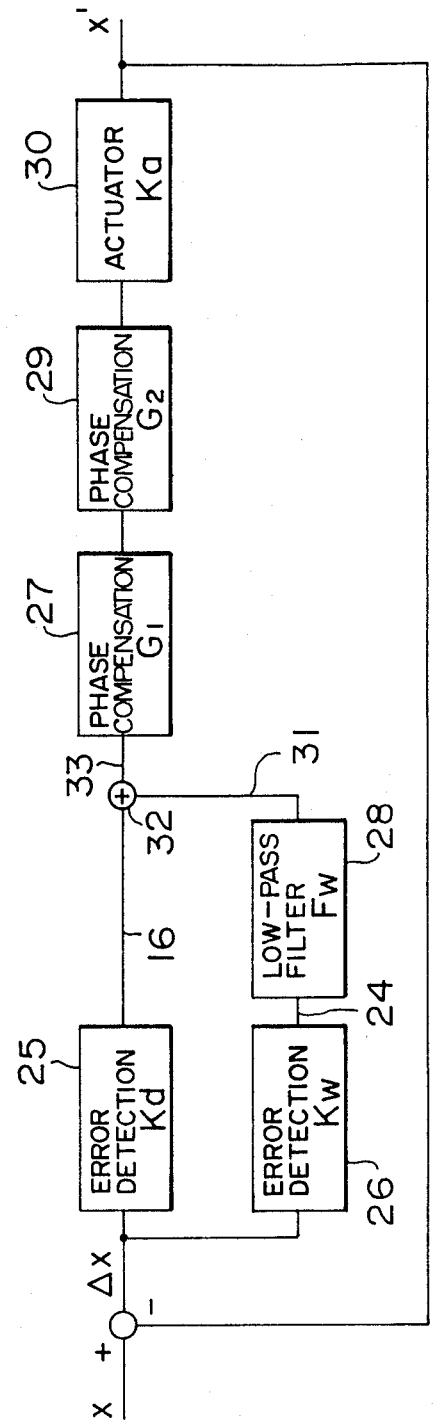
FIG. 7 is a block diagram showing the structure of an embodiment of the composite wobbled tracking servo system according to the present invention.

FIG. 7 is a block diagram showing the structure of an embodiment of the composite wobbled tracking servo system according to the present invention. The tracking servo system of the present invention shown in FIG. 7 has a dual servo system structure including a push-pull loop and a wobbled loop. In the tracking servo system of the present invention, the push-pull loop includes a tracking error detecting element (Kd) 25 utilizing the pregrooves, phase compensating elements (G$_1$) 27 and (G$_2$) 29, and a tracking actuator (Ka) 30. The wobbled loop includes a tracking error detecting element (Kw) 26 utilizing the wobbled track marks, a low-pass filter (Fw) 28, and the common phase compensating elements, 27, 29 and the common tracking actuator 30 of the push-pull loop.

In the disc structure employed in the present invention and shown in FIGS. 2a to 2d, suppose, for example, that the number n of sectors per complete track is n=32, and the frequency fo of rotation of the disc 10 is fo=30 Hz. Then, the prewobbling tracking error signal 24 detected from the prewobbling pits 20 included in the header field 123 is sampled at a frequency of nfo=32×30=960, that is, about 900 Hz. This prewobbling tracking error signal 24 is an accurate servo signal free from any offset attributable to, for example, tilting of the disc 10. Therefore, this prewobbling tracking error signal 24 is suitable for controlling a lowfrequency range of the servo system of FIG. 7.

Figure 8:
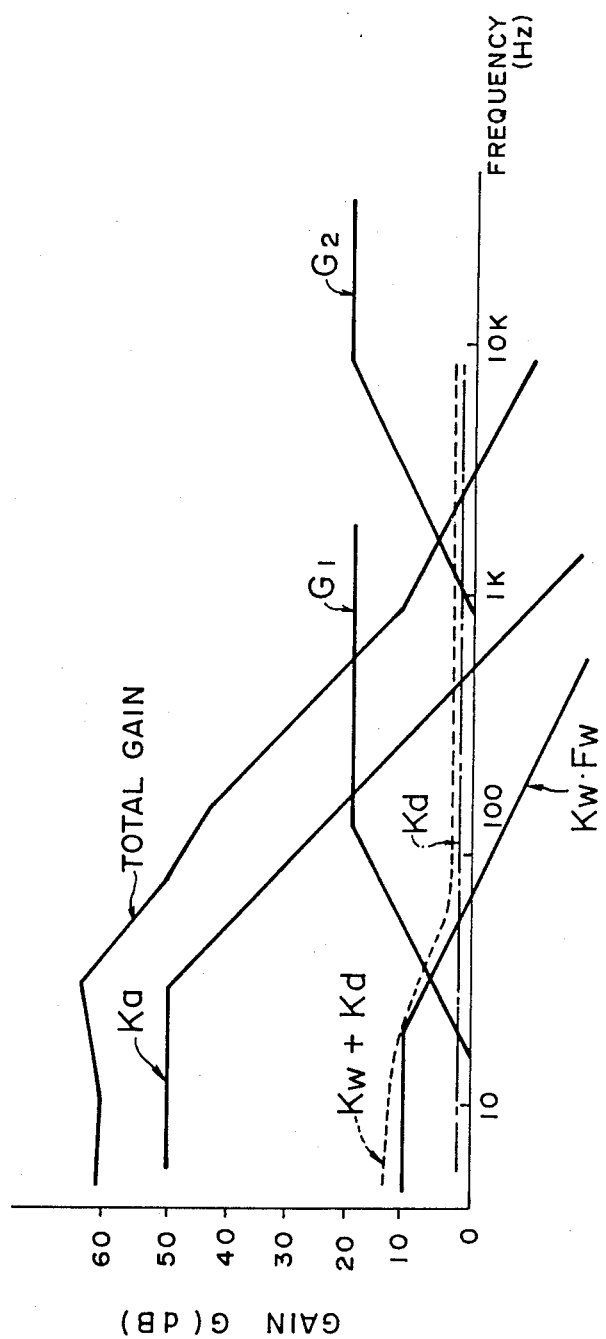
FIG. 8 is a graph showing the frequency characteristics of tracking error signals appearing in the composite wobbled tracking servo system shown in FIG. 7.

In the servo block diagram shown in FIG. 7, the prewobbling track error signal 24 is passed through the low-pass filter (Fw) 28 having a band-limiting filter characteristics as shown in FIG. 8, and a band-limited servo signal 31 that can handle the servo action in the low-frequency range appears from the low-pass filter (Fw) 28. When, for example, n=32 and fo=30 Hz as described above, the cut-off frequency Fc of the low-pass filter (Fw) 28 is preferably selected to be Fc=100 Hz.

Figure 9:
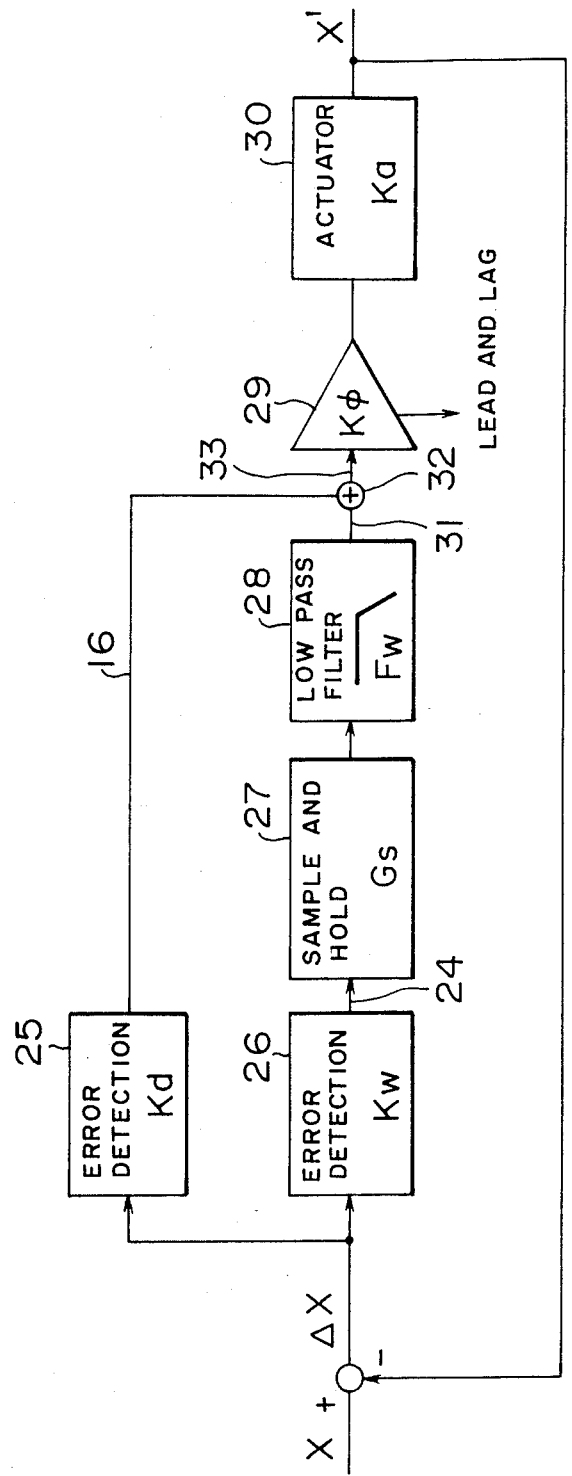
FIG. 9 is a block diagram showing the structure of another embodiment of the composite wobbled tracking servo system according to the present invention.

On the other hand, in the case of the push-pull tracking error signal 16 detected from the pregrooves 15, the method of signal detection is based on the diffracted light distribution. Therefore, this signal 16 includes a dc offset attributable to, for example, tilting of the disc 10, as described already. In the tracking servo system of the present invention, the pregroove tracking error signal 16 covers from a low-frequency range to a high-frequency range as shown in FIG. 8. The prewobbling tracking error signal 31 of the high gain band-limited by the low-pass filter (Fw) 28 in the manner described above and the push-pull tracking error signal 16 of low gain are added in an adder circuit 32 as shown in FIG. 7, and the resultant tracking error signal 33 is phase-compensated by the phase compensating circuits (G$_1$) 27 and (G$_2$) 29 and is then applied to the tracking actuator (Ka) 30 to consistitute the servo block FIG. 9 is a block diagram showing the structure of another embodiment of the tracking servo system according to the present invention. The tracking servo system shown in FIG. 9 has also a dual servo system structure including a push-pull loop and a wobbled loop. The push-pull loop includes a tracking error detecting element (Kd) 25 converting the amount and direction of deviation of the light spot from the track center into an electrical signal on the basis of the distribution of diffracted light from the pregrooves, a phase compensating element (K$\phi$) 29 and a tracking actuator (Ka) 30. The wobbled loop includes a tracking error detecting element (Kw) 26 utilizing the wobbled track marks, a sample and hold circuit (Gs) 27, a low-pass filter (Fw) 28, and the common phase compensating element (K$\phi$) 29 and the common tracking actuator (Ka) 30 of the push-pull loop.

In the disk structure employed in the present invention, suppose, for example, that the number n of sectors per complete track is n=32, and the frequency fo of rotation of the disc is fo=30 Hz. Then, the prewobbling tracking error signal 24 detected from the prewobbling pits 20 is sampled at a frequency of about 900 Hz. This prewobbling tracking error signal 24 is suitable for controlling a low-frequency range of the servo system. The prewobbling tracking error signal 24 is passed through the sample and hold circuit 27 and then through the low-pass filter (Fw) 28 having a band-limiting filter characteristic as shown in FIG. 8, and a band-limited servo signal 31 that can handle the servo action in the low-frequency range appears from the low-pass filter (Fw) 28. When, for example, n=32 and fo=30 Hz as described above, the cut-off frequency Fc of the low-pass filter (Fw) 28 is preferably selected to be Fc=100 Hz.

On the other hand, in the case of the push-pull tracking error signal 16 detected from the pregrooves 15-1 and 15-2, the method of signal detection is based on the diffracted light distribution. Therefore, this signal 16 includes a dc offset attributable to, for example, tilting of the disc 10, as described already. This pregroove tracking error signal 16 covers from a low-frequency range to a high-frequency range. The prewobbling tracking error signal 31 of high gain bandlimited by the low-pass filter (Fw) 28 and the push-pull tracking error signal 16 of low gain are added in an adder circuit 32. The resultant tracking erro signal 33 is phase-compensated by the phase compensating element (K$\phi$) 29 and is then applied to the tracking actuator (Ka) 30 to constitute the servo block. The wobbled loop acts to suppress a low-frequency offset of less than 30 Hz attributable to secular variations of the mechanical and optical systems and tilting, eccentricity or the like of the disc 10. When the proportional sensitivities of the individual elements only are noted for convenience of description, the steady-state error Δx is expressed as follows:

$$\Delta X = X - X' = X \cdot$$

$$\left(1 - \frac{Kd \cdot K\phi \cdot Ka + Kw \cdot K\phi \cdot Ka}{1 + Kd \cdot K\phi \cdot Ka + Kw \cdot K\phi \cdot Ka + K_F \cdot Kd \cdot K\phi \cdot Ka}\right)$$

$$= X \cdot \left(\frac{1}{1 + \frac{Kd \cdot K\phi \cdot Ka + Kw \cdot K\phi \cdot Ka}{1 + K_F \cdot Kd \cdot K\phi \cdot Ka}}\right)$$

where $K_F$ is the sensitivity of the offset. It can be seen from the above expression that the proportional sensitivity Kw of the wobbled loop detecting the true track center suppresses the offset occuring in the push-pull loop.

Figure 10:
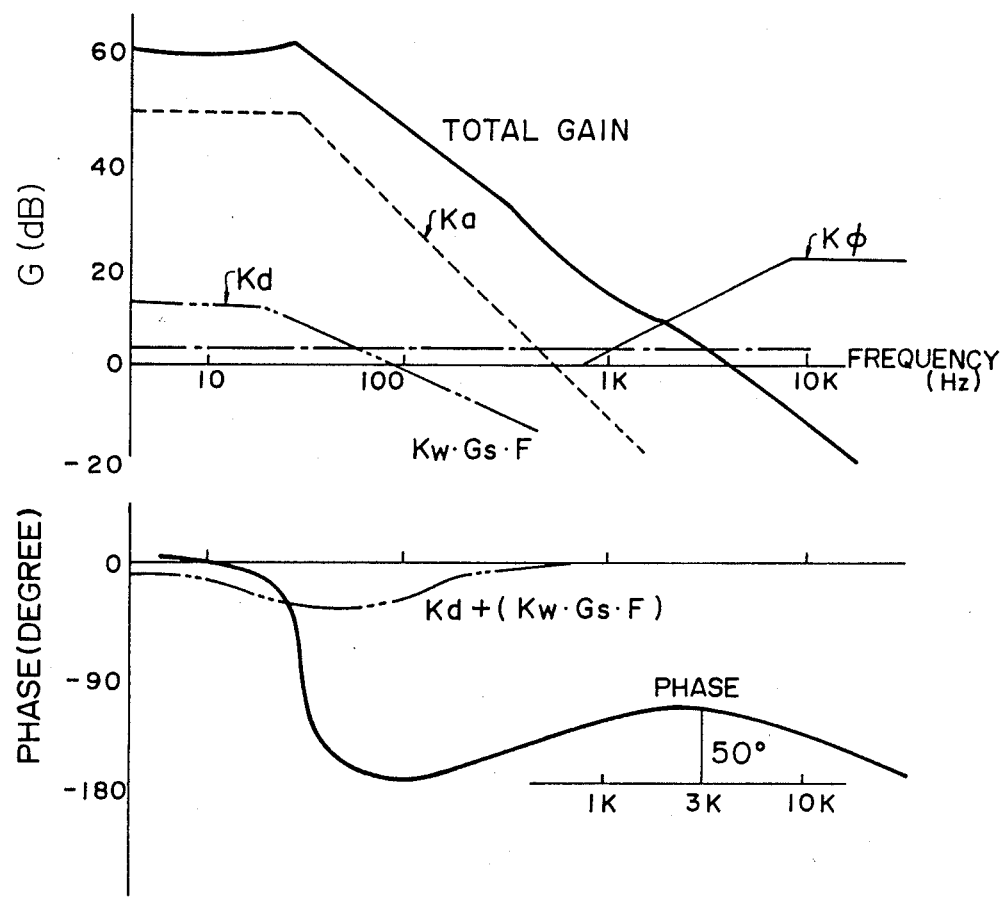
FIG. 10 is a graph showing the frequency characteristics of tracking error signals appearing in the composite wobbled tracking servo system shown in FIG. 9.

FIGS. 8 and 10 are Bode diagrams. It will be seen that the proportional sensitivity Kd of the pushpull loop is about 2 dB and is constant in the range of from dc to 10 KHz. The proportional sensitivity Kw of the wobbled loop is about 14 dB and is low-passed at 30 Hz. As will be apparent from the equation described above, (Kw−Kd) represents the amount of suppression for all the offsets including the gain offset occurring in the push-pull loop and is 12 dB and 9 dB at dc and 30 Hz respectively. Therefore, even when a dc offset of, for example, 0.1 μm occurs, the practical track error is suppressed to 0.02 μm. The band of the wobbled loop is restricted by the period of the wobbled track marks, hence, by the sampling period. Therefore, in order to stabilize the operation of the servo system, it is necessary to attenuate the gain in the high-frequency range by the low-pass filter (Fw) 28.

Figure 11:
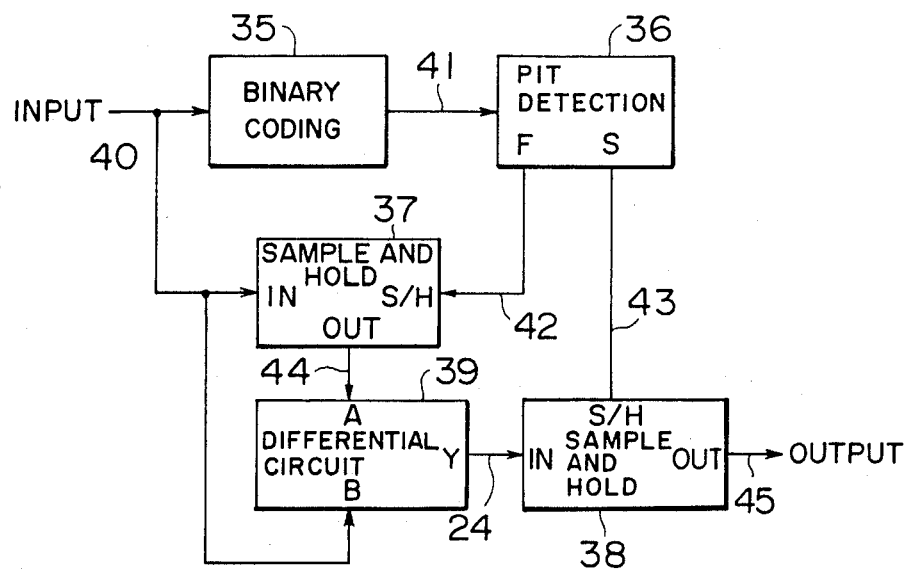
FIG. 11 is a block diagram showing the basic structure of a circuit employed in the present invention for detecting the tracking error signal from the prewobbling pits.
Figure 12:
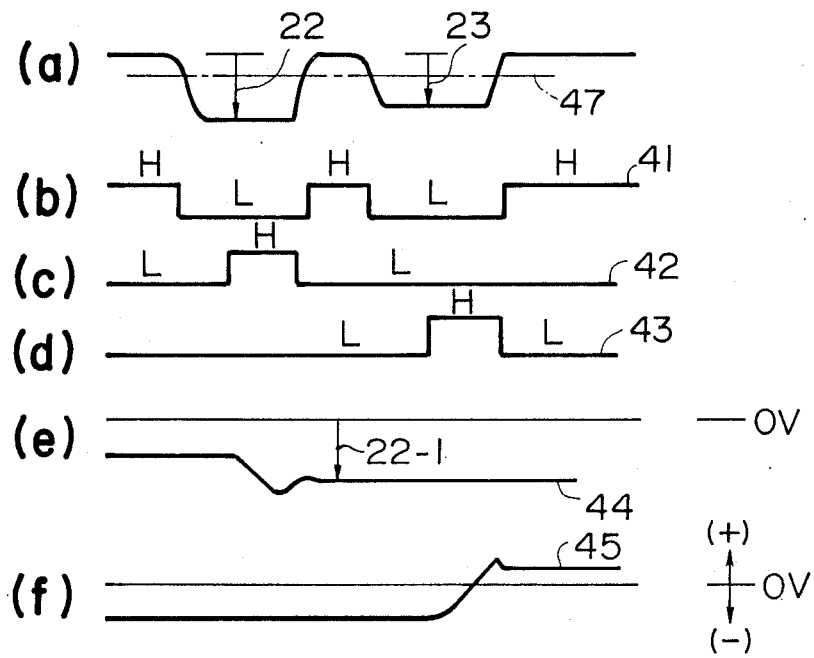
FIG. 12 (a-f) shows signal waveforms appearing at various parts of FIG. 11.

FIG. 11 is a block diagram showing the basic structure of the tracking error detecting element 26 and sample-hold circuit 27 shown in FIG. 9. FIG. 12 shows signal waveforms appearing at various parts of FIG. 11. Waveforms shown in (a), (b), (c), (d) and (e) of FIG. 12 correspond to signals 40, 41, 42, 43 and 44 shown in FIG. 11 respectively.

The operation of the blocks shown in FIG. 11 will be described with reference to FIG. 12. The relative luminance signal from the light detector 13 (the sum signal of the output signals of the light receiving sections 131 and 132) is applied as an input signal 40 having a waveform as shown in (a) of FIG. 12. This input signal 40 is applied to a binary coding circuit 35 where the input signal 40 is clipped at a threshold level 47 shown in (a) of FIG. 12 to be turned into a binary signal 41 having a waveform as shown in (b) of FIG. 12. The binary signal 41 is applied to a pit detecting circuit 36 where elongate pits (wobbled track marks) carrying track error information are detected. The pit detecting circuit 36 applies a first sample signal 42 having a waveform as shown in (c) of FIG. 12 to a first sample and hold circuit 37 and applies also a second sample signal 43 having a waveform as shown in (d) of FIG. 12 to a second sample and hold circuit 38. The information (22 shown in (a) of FIG. 12) contained in first elongate pit 20-1 is sampled by the sample and hold circuit 37 while the first sample signal 42 is in its high level, and is then held in the sample and hold circuit 37 as soon as the sample signal 42 is turned into its low level from the high level. Thus, an output signal 44 held at a level 22-1 and having a waveform as shown in (e) of FIG. 12 appears from the first sample and hold circuit 37. This output signal 44 from the sample and hold circuit 37 and the input signal 40 are applied to a differential circuit 39, and the output signal 24 of the differential circuit 39 is applied to the second sample and hold circuit 38. The signal 24 is sampled while the second sample signal 43 is in its high level and is then held as soon as the signal 43 is turned into its low level from the high level. Thus, a tracking error signal 45 having a waveform as shown in (f) of FIG. 12 appears from the second sample and hold circuit 38.

Figure 13:
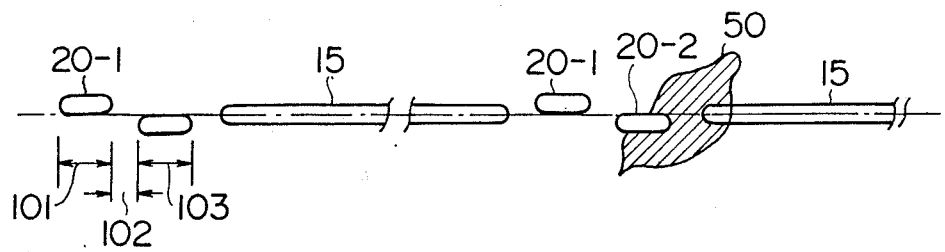
FIG. 13 is an enlarged view of part of the track format employed in the embodiments of the present invention.

A problem arises when the prewobbling elongate pit 20-1 or 20-2 is damaged by a scar or dust present on the disc surface. This is because a wrong tracking error signal will be detected in such a case. FIG. 13 is an enlarged view of part of the recordable/reproducible optical disc 10 employed in the present invention and illustrates that one of prewobbling elongated pits is damaged by a scar. In FIG. 13, there are shown a first prewobbling elongate pit 20-1, a second prewobbling elongate pit 20-2, a pregroove 15 and a damaged portion 50. In FIG. 13, the length 101 of the first elongate pit 20-1, the length 102 of the gap and length 103 of the second elongate pit 20-2 have a ratio of 6:4:6. However, the ratio is in no way limited to that specified above, when this part is regarded to be a servo mark (a wobbled track mark) and the pattern of modulation of an index and data to be recorded on the pregroove 15 is, for example, a two-to-seven modulation pattern.

Figure 15:
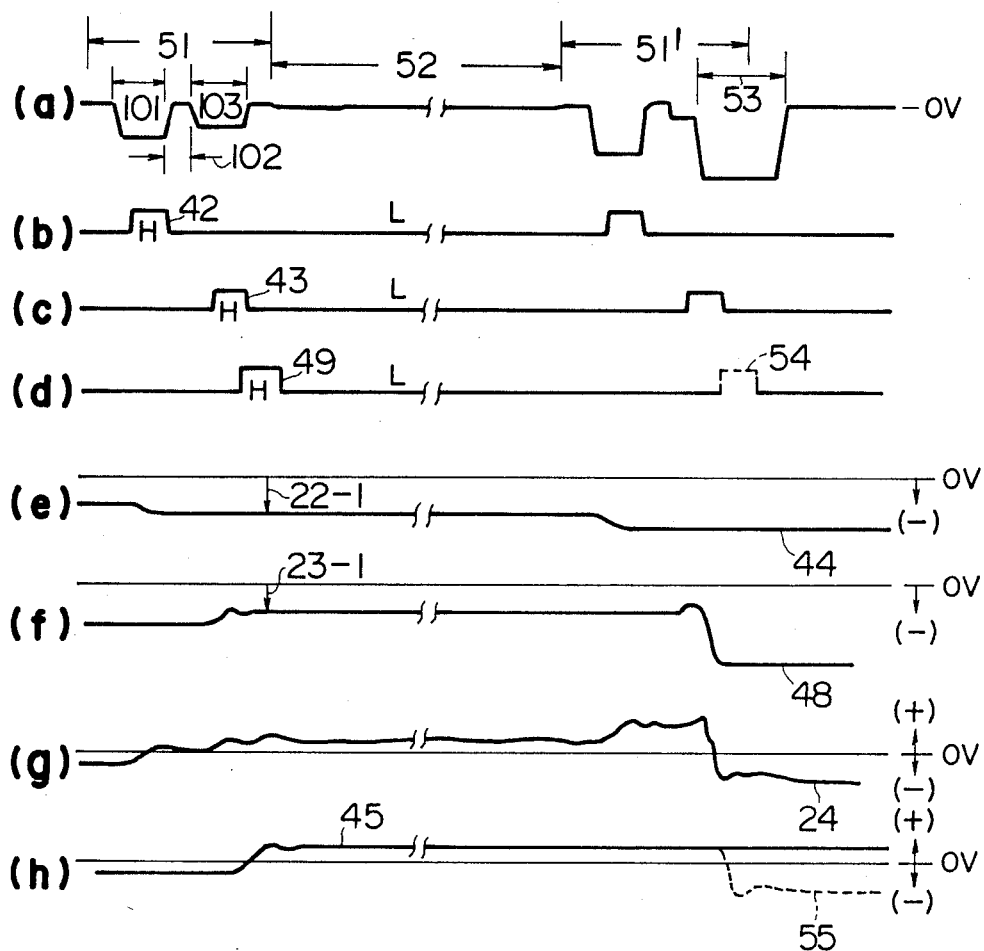
FIG. 15 ('a-h) shows signal waveforms appearing at various parts of FIG. 14.
Figure 14:
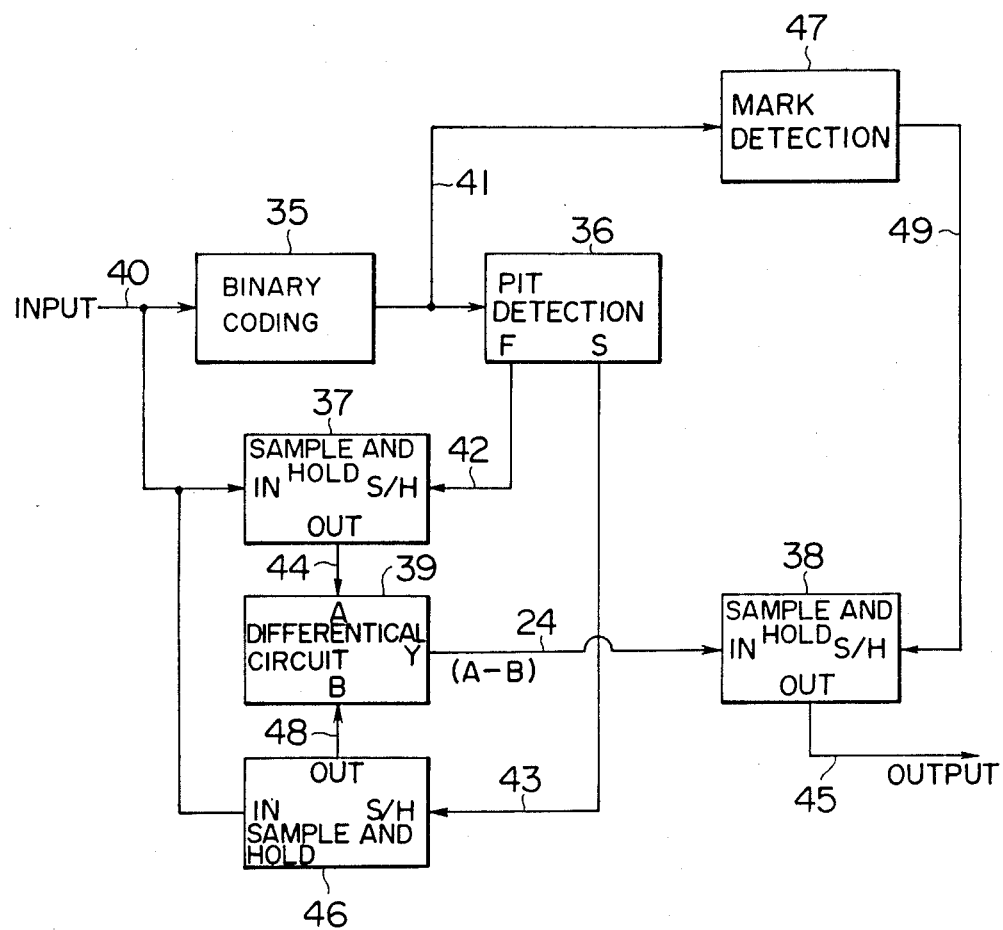
FIG. 14 is a block diagram showing the structure of a modification of the tracking error detecting circuit shown in FIG. 11.

FIG. 14 is a block diagram showing the practical structure of the tracking error detecting circuit 26 utilizing the prewobbling pits. This tracking error detecting circuit 26 is provided by adding a servo mark detecting circuit 47 and a third sample and hold circuit 46 to the basic circuit block diagram shown in FIG. 11. FIG. 15 is a time chart of the operation of the circuit 26 shown in FIG. 14. In (a) of FIG. 15, there are shown an N-th servo mark period 51, an N-th pregroove period 52, an (N+1)-th servo mark period 51', and a damaged-portion period 53 due to the presence of a scar. Waveforms shown in (a), (b), (c), (d), (e), (f), (g) and (h) of FIG. 15 correspond to signals 40, 42, 43, 49, 44, 48, 24 and 45 shown in FIG. 14 respectively. The operation of the circuit 26 shown in FIG. 14 will be described with reference to FIG. 15 and part of FIG. 11.

The relative luminance signal from the light detector 13 is applied as an input signal 40 having a waveform as shown in (a) of FIG. 15. This input signal 40 is applied to the binary coding circuit 35 where the input signal 40 is turned into a binary signal 41. The binary signal 41 is applied to the pit detecting circuit 36, and a signal 42 including a first sample pulse (s-own in (b) of FIG. 15) indicative of detection of the first elongate pit and a signal 43 including a second sample pulse (shown in (c) of FIG. 15) indicative of detection of the second elongate pit appear from the pit detecting circuit 36. The first and third sample and hold circuits 37 and 46 sample and hold the input signal 40. The output signal 44 of the first sample and hold circuit 37 having a waveform as shown in (e) of FIG. 15 and the output signal 48 of the third sample and hold circuit 46 having a waveform as shown in (f) of FIG. 15 are applied to the differential circuit 39, and a tracking error signal 24 having a waveform as shown in (g) of FIG. 15 appears from the differential circuit 39. The binary signal 41 is also applied to the servo mark detecting circuit 47 which carries out pattern matching and generates a mark detection signal 49 having a waveform as shown (d) of FIG. 15 when the servo mark is recognized as a result of pattern matching. The second or output sample and hold circuit 38 samples the tracking error detection signal 24 (H in (d) of FIG. 15) and holds the signal 24 (L in (d) of FIG. 15), thereby finally generating a tracking error signal 45 based on the prewobbling pits and having a waveform as shown in (h) of FIG. 15. The above description refers to the normal operation. When a scar 50 as illustrated in FIG. 13 is present on the disc surface, the damaged-portion period 53 appears in the waveform shown in (a) of FIG. 15. However, in the circuit form shown in FIG. 14, the output sampling and hold circuit 38 holds the previous data, unless the servo mark detecting circuit 47 mal-operates. When the circuit 47 mal-operates, a pulse 54 as indicated by the dotted line in (d) of FIG. 15 appears. Therefore, disturbance due to the presence of a scar on the disc surface, which disturbance is unavoidable in the case of the structure shown in FIG. 11, would not appear in the final output signal 45, and the signal 45 has a solid-line waveform free from a damage component 55 shown by the dotted line in (h) of FIG. 15.

Figure 16:
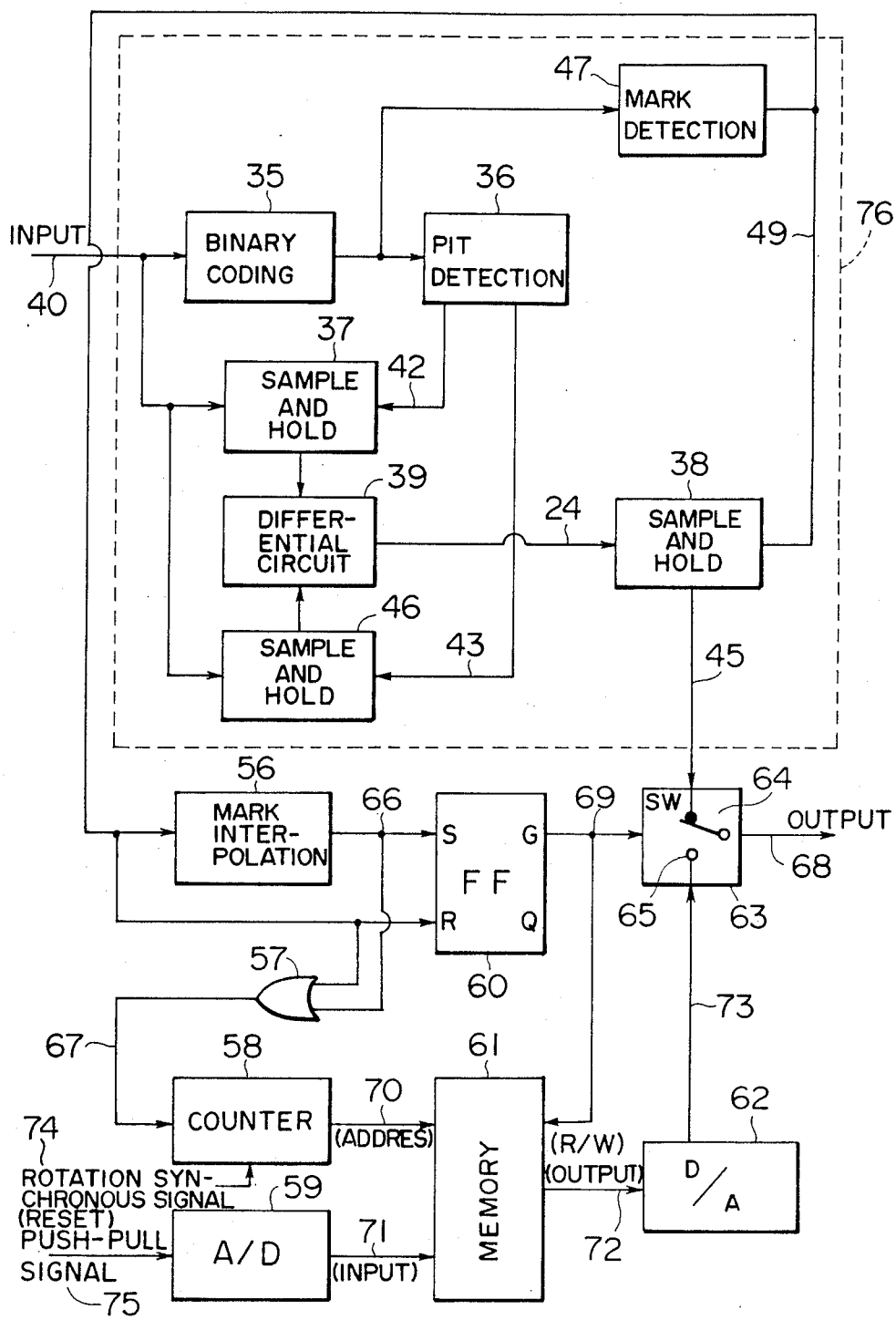
FIG. 16 is a block diagram showing the structure of another form of the tracking error detecting circuit employed in the tracking servo system according to the present invention.

FIG. 16 is a block diagram of another form of the tracking error detecting circuit 26 utilizing the prewobbling pits for tracking error detection according to the present invention. The first form of the tracking error detecting circuit described above includes still the possibility of unstable tracking when a plurality of damaged servo marks are present in the same track. The form shown in FIG. 16 can deal with the presence of plurality of damaged servo marks. Parts enclosed by the dotted line 76 have the same structure and operate in the some way as the equivalent parts of the circuit shown in FIG. 14, and such parts will not be especially referred to in the following description.

Figure 17:
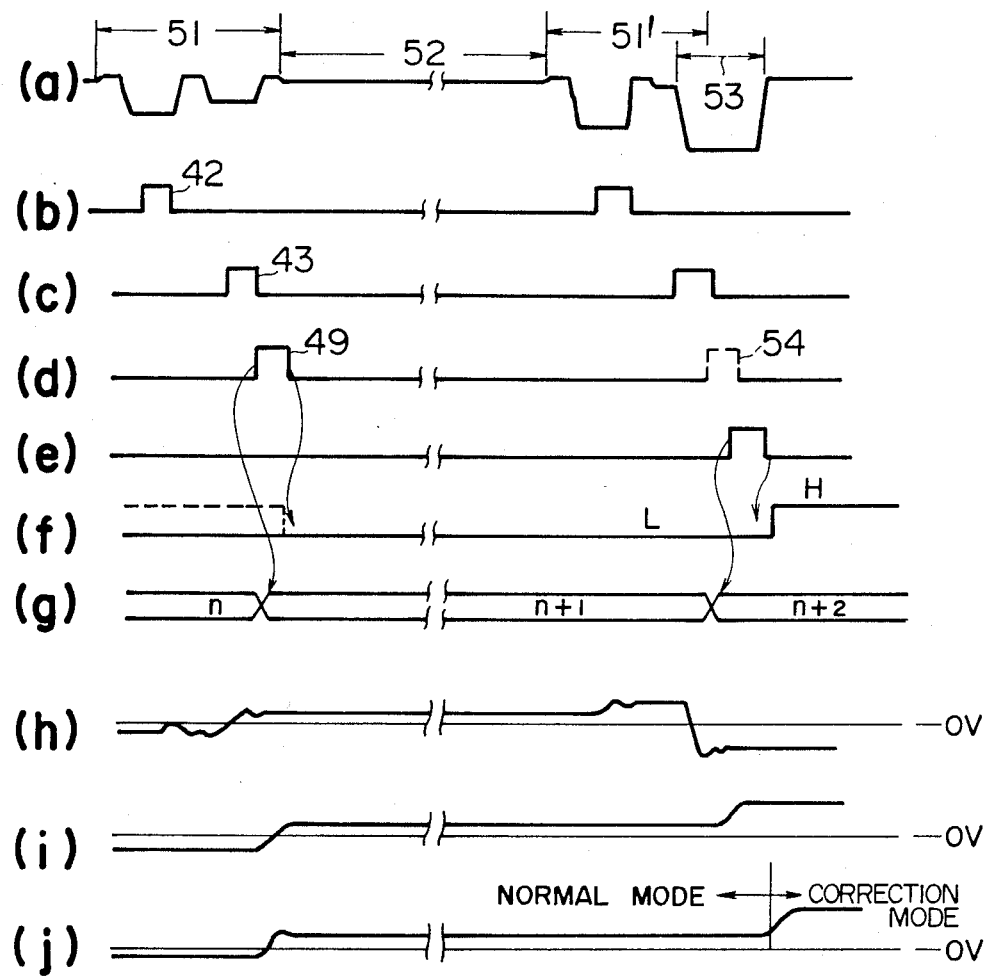
FIG. 17 (a-j) shows signal waveforms appearing at various parts of FIG. 16.

FIG. 17 shows signal waveforms appearing at various parts of FIG. 16, and waveforms shown in (a), (b), (c), (d), (e), (f), (g), (h), (i) and (j) of FIG. 17 correspond to signals 40, 42, 43, 49, 66, 69, 70, 24, 72 and 68 shown in FIG. 16 respectively. As described above, explanation of the tracking error detecting circuit part 76 enclosed by the dotted line is unnecessary. The circuit shown in FIG. 16 is based on the fact that the tracking error signal 16 detected from the pregrooves is apparently offset by the prewobbling tracking error signal 24 and is featured by the provision of a circuit, which stores the pregroove tracking error signal 16 when the servo marks are normally detected, but replaces the pregroove tracking error signal by the stored prewobbling tracking error signal when the servo marks are dropped out. Such a circuit is added to the track error detecting circuit part 76 shown in FIG. 14.

When the mark detection signal 49 shown in (d) of FIG. 17 is normally generated, a flip-flop 60 is reset, and a Q output signal 69 of low level appears from the flip-flop 60. As a result, an analog switch 63 conducts at its normally-closed contact 64, and the output signal 45 (shown in (h) of FIG. 17) of the output sample and hold circuit 38 appears as the final output signal shown in (j) of FIG. 17. An analog inverted signal of a push-pull signal 75 indicative of pregroove track error detection is quantized by an A/D converter 59, and the resultant data 71 is written in a memory 61. When a mark drop-out as shown by 54 in (d) of FIG. 17 occurs then in the mark detection signal 49, a mark interpolating circuit 56 operates to apply a mark drop-out detection signal 66 as shown in (e) of FIG. 17 to the flip-flop 60 to set the flip-flop 60 as shown in (f) of FIG. 17. The analog switch 63 conducts now at its normally-open contact 65, and, at the same time, the data 72 of the inverted push-pull signal written in the memory 61 during normal operation is now read out from the memory 61. An output signal 73 as shown in (i) of FIG. 17 appears from a D/A converter 62 and is applied to the contact 65 of the analog switch 63, so that a corrected final output signal, that is, a prewobbling tracking error signal 68 as shown in (j) of FIG. 17 is obtained. A counter 58 is reset by a rotation synchronous signal 74 generated every complete rotation of the optical disc 10. The counter 58 is incremented by a leading edge of an output signal 67 of an OR circuit 57 to which the mark detection signal 49 and the mark drop-out detection signal 66 are applied. The resultant output signal 70 (shown in (g) of FIG. 17) of the counter 58 provides read/write address information applied to the memory 61.

Thus, the embodiments of the tracking servo system of the present invention shown in FIGS. 7 and 9 ensure tracking with high accuracy without giving rise to an undesirable offset.

It will be understood from the foregoing detailed description of the composite wobbled tracking servo system of the present invention that information can be accurately recorded with a high recording density on an optical disc, and the information thus recorded with the high recording density can be accurately read out from the optical disc. Therefore, the present invention can stimulate a great progress when applied to the field of digital discs, digital audio discs and the like. The present invention can obviate the defect of the prior art manner of information recording on pregrooves, that is, the defect of giving rise to a great tracking offset attributable to, for example, tilting of an optical disc. The present invention can also prevent mal-operation due to defective servo marks or sector marks on an optical disc, thereby eliminating the necessity for re-writing servo marks and/or sector marks and the necessity for replacement of the optical disc. Therefore, the present invention can improve the productivity of optical discs and can also reduce the manufacturing costs of optical discs.

What is claimed is:

1. A tracking control method for a composite wobbled tracking servo system, comprising the steps of:
    preparing a rotary recording medium having a first field and a second field alternately arranged along the direction of rotation of the recording medium to provide a sector, pregrooves being provided at least in said second field, said first field including at least one pair of wobbled track marks disposed in a relation wobbled relative to the center of a track;
    irradiating the recording surface of said recording medium with a light spot;
    detecting a first tracking error signal from the reflection of said light spot diffracted by said pregrooves on said recording medium;
    detecting a second tracking error signal from the reflection of said light spot traversing said wobbled track marks;
    correcting said first tracking error signal on the basis of said second tracking error signal; and
    using the corrected signal for the tracking control;
    wherein a dc offset of said first tracking error signal is removed by a band-limited high-pass filter, and high frequency components of said second tracking error signal are removed by a band-limited low-pass filter, said two different tracking error signals covering different frequency ranges of said servo system.

2. A tracking control method for a composite wobbled tracking servo system, comprising the steps of:
preparing a rotary recording medium having a first field and a second field alternately arranged along the direction of rotation of the recording medium to provide a sector, pregrooves being provided at least in said second field, said first field including at least one pair of wobbled track marks disposed in a relation wobbled relative to the center of a track;
irraddiating the recording surface of said recording medium with a light spot;
detecting a first tracking error signal from the reflection of said light spot diffracted by said pregrooves on said recording medium:
detecting a second tracking error signal from the reflection of said light spot traversing said wobbled track marks;
correcting said first tracking error signal on the basis of said second tracking error signal; and
using the corrected signal for the tracking control;
wherein said wobbled track mark signal on the basis of said second tracking error signal; and
using the corrected signal for the tracking control;
wherein the gain of said second tracking error signal in a low frequency range is selected to be larger than that of said first tracking error signal, and said second tracking error signal whose high frequency components are removed by a band-limited low-pass filter is used to correct said first tracking error signal.

3. A method as claimed in claim 2, wherein said light spot is positioned on the center of a land between said pregrooves, under control of said corrected signal.

4. A method as claimed in claim 2, wherein said light spot is positioned on the center of said pregroove under control of said corrected signal.

5. A tracking control method for a composite wobbled tracking servo system, comprising the steps of:
preparing a rotary recording medium having a first field and a second field alternately arranged along the direction of rotation of the recording medium to provide a sector, pregrooves being provided at least in said second field, said first field including at least one pair of wobbled track marks disposed in a relation wobbled relative to the center of a track;
irradiating the recording surface of said recording medium with a light spot;
detecting a first tracking error signal from the reflection of said light spot diffracted by said pregrooves on said recording medium;
detecting a second tracking error signal from the reflection of said light spot traversing said wobbled track marks;
correcting said first tracking error signal on the basis of said second tracking error signal; and
using the corrected signal for the tracking control;
wherein said wobbled track mark is recognized by pattern recognition means, and, only when the result of pattern recognition shows that said wobbled track mark detection is normal, said second tracking error signal is delivered as an output signal of a sample and hold circuit.

6. A method as claimed in claim 5, wherein, when the result of pattern recognition shows that said wobbled track mark detection is normal, said first tracking error signal corrected by said second tracking error signal is stored in a memory, but, when the result of pattern recognition shows that said wobbled track mark detection is abnormal, said corrected first tracking error signal stored in said memory is used for the tracking control.

7. A tracking control apparatus for a composite wobbled tracking servo system, comprising:
a rotary recording medium having a first field and a second field alternately arranged along the direction of rotation of said recording medium to provide a sector, pregrooves being provided at least in said second field, said first field including at least one pair of wobbled track marks disposed in a relation wobbled relative to the center of a track;
irradiating means for irradiating the recording surface of said recording medium with a light spot;
first detecting means for detecting a first tracking error signal from the reflection of said light spot diffracted by said pregrooves on said recording medium;
second detecting means for detecting a second tracking error signal from the reflection of said light spot traversing said wobbled track marks, said second detecting means having a detection sensitivity in a low frequency range which is higher than that of said first detecting means;
means for correcting said first tracking error signal on the basis of said second tracking error signal, said correcting means including a low-pass filter for limiting the band of said second tracking error signal and adder means for adding an output signal of said low-pass filter to said first tracking error signal; and
means for driving a tracking control means disposed in said irradiating means in response to the application of an output signal of said correcting means.

8. An apparatus as claimed in claim 7 wherein said second detecting means detects said second tracking error signal on the basis of the relative intensity of the reflections of said light spot traversing said wobbled track marks respectively and includes third means for generating control pulse signals on the basis of said reflections, and fourth means operative in response to said control pulse signals for sampling a signal indicative of the difference between the reflections of said light spot traversing said wobbled track marks respectively and then holding said sampled signal.

9. An apparatus as claimed in claim 8, wherein said second detecting means further includes fifth means for recognizing the pattern of said wobbled track marks on the basis of the reflections of said light spot traversing said wobbled track marks, and for generating an output signal to control the sampling and holding operation of said fourth means.

10. An apparatus as claimed in claim 9, further comprising memory means for storing said corrected first tracking error signal, switching means for switching over between an output signal of said memory means and an output signal of said fourth means, and means for generating a signal for controlling the switching operation of said switching means on the basis of the output signal of said fifth means.

11. A rotary optical-information disc comprising a first field and a second field alternately arranged along the direction of rotation of said disc to provide a sector, pregrooves disposed in at least said second field and extending in the direction of rotation of said disc while being spaced apart in the radial direction of said disc, a land provided on the space between said pregrooves, and at least one pair of wobbled track marks previously disposed in said first field in a relation wobbled relative to the centerline extending in parallel to and between said pregrooves, whereby recording and reproduction of information is enabled on said land along said centerline extending between said pregrooves, wherein at least an address pit for identifying said sector is previously formed along said centerline extending between said pregrooves, and wherein said wobbled track marks are provided at the head of said sector and serve also as sector marks.

12. A disc as claimed in claim 11, wherein said pregrooves extend to the area where said address pit is formed.

13. A tracking control apparatus comprising:
a rotary recording medium having a first field and a second field alternately arranged along the direction of rotation of the recording medium to provide a sector, pregrooves being provided at least in said second field, said first field including at least one correction mark for correcting track offset due to said pregrooves;
irradiating means for irradiating the recording surface of said recording medium with a light spot;
first detecting means for detecting a first tracking error signal from the reflection of said light spot diffracted by said pregrooves on said recording medium;
second detecting means for detecting a second tracking error signal by sampling a signal due to the reflection of said light spot traversing said correction mark;
removing means for removing high frequency components of said second tracking error signal;
means for correcting said first tracking error signal on the basis of an output signal of said removing means; and
means for driving a tracking control means disposed in said irradiating means in response to the application of an output signal of said correcting means;
wherein said second detecting means has a detection sensitivity in a low frequency range which is higher than that of said first detecting means.

14. An apparatus as claimed in claim 13, wherein said tracking control means is responsive to said driving means for enabling positioning of said light spot on the center of a land between said pregrooves.

15. An apparatus as claimed in claim 13, wherein said tracking control means is responsive to said driving means for enabling positioning of said light spot on the center of said pregroove.

16. An apparatus as claimed in claim 13, wherein said second detecting means further includes means for recognizing the pattern of said correction mark on the basis of the reflection of said light spot traversing said correction mark and for generating an output signal to control said sampling.

17. An apparatus as claimed in claim 13, wherein said correction mark includes at least one pair of wobbled track marks disposed in a relation wobbled relative to the center of a track.

18. An apparatus as claimed in claim 17, wherein said second detecting means detects said second tracking error signal on the basis of the relative intensity of the reflections of said light spot traversing said wobbled track marks respectively and includes means for generating control pulse signals on the basis of said reflections, and means responsive to said control pulse signals for sampling a signal indicative of the difference between the reflections of said light spot traversing said wobbled track marks respectively and then holding said sampled signal.

19. An apparatus as claimed in claim 13, wherein said correcting means includes adder means for adding said output signal of said removing means to said first tracking error signal.

20. A tracking control apparatus comprising:
a rotary recording medium having a first field and a second field alternately arranged along the direction of rotation of the recording medium to provide a sector, pregrooves being provided at least in said second field, said first field including at least one correction mark for correcting track offset due to said pregrooves;
irradiating means for irradiating the recording surface of said recording medium with a light spot;
first detecting means for detecting a first tracking error signal from the reflection of said light spot diffracted by said pregrooves on said recording medium;
second detecting means for detecting a second tracking error signal by sampling a signal due to the reflection of said light spot traversing said correction mark;
removing means for removing high frequency components of said second tracking error signal;
means for correcting said first tracking error signal on the basis of an output signal of said removing means; and
means for driving a tracking control means disposed in said irradiating means in response to the application of an output signal of said correcting means;
wherein said second detecting means further includes means for recognizing the pattern of said correction mark on the basis of the reflection of said light spot traversing said correction mark and for generating an output signal to control said sampling; and further comprising memory means for storing said corrected first tracking error signal, switching means for switching over between an output signal of said memory means and an output signal of said second detecting means; and means for generating a signal for controlling the switching operation of said switching means on the basis of the output signal from said recognizing means.

21. A tracking control method for an optical disc hagving at least one correction mark for correcting track offset, comprising the steps of:
preparing said optical disc having a first field and a second field alternately arranged along the direction of rotation of said optical disc to provide a sector, pregrooves being provided at least on said second field, said first field including said at least one correction mark;
irradiating the recording surface of said optical disc with a light spot;
detecting a first tracking error signal from the reflection of said light spot diffracted by said pregrooves on said optical disc;
detecting a second tracking error signal by sampling a signal due to the reflection of said light spot traversing said correction mark, the gain of said second tracking error signal in a low freqeuncy range being selected to be larger than that of said first tracking error signal;
removing high frequency components of said second tracking signal by a band-limited low-pass filter:
correcting said first tracking error signal on the basis of an output signal of said filter; and
using the corrected signal for the tracking control.

* * * * *